(12) United States Patent
Zev

(10) Patent No.: US 7,354,272 B1
(45) Date of Patent: Apr. 8, 2008

(54) MANIPULATIVE TILE AS LEARNING TOOL

(76) Inventor: Marc David Zev, 10200 Mason Ave., #194, Chatsworth, CA (US) 91311

(*) Notice: Subject to any disclaimer, the term of this patent is extended or adjusted under 35 U.S.C. 154(b) by 153 days.

(21) Appl. No.: 11/211,067

(22) Filed: Aug. 24, 2005

Related U.S. Application Data

(60) Provisional application No. 60/613,107, filed on Sep. 27, 2004.

(51) Int. Cl.
*G09B 19/02* (2006.01)

(52) U.S. Cl. .................................. 434/188; 434/191

(58) Field of Classification Search ............... 434/188, 434/191, 195, 198, 205, 215; 446/487
See application file for complete search history.

(56) References Cited

U.S. PATENT DOCUMENTS

| | | | | |
|---|---|---|---|---|
| 1,244,000 A | * | 10/1917 | Soltoft | 434/205 |
| 1,664,808 A | * | 4/1928 | Cooper | 434/205 |
| 2,748,500 A | * | 6/1956 | Cormack | 434/205 |
| 3,125,814 A | * | 3/1964 | Walcuk | 434/195 |
| 3,414,986 A | * | 12/1968 | Stassen et al. | 434/195 |
| 3,758,962 A | * | 9/1973 | Bagdasar | 434/205 |
| 3,935,649 A | * | 2/1976 | Harte | 434/195 |
| 5,040,987 A | * | 8/1991 | Frazier | 434/188 |
| 5,137,452 A | * | 8/1992 | Pollock | 434/195 |
| 5,599,188 A | * | 2/1997 | Lemos Melendez | 434/195 |
| 5,997,305 A | * | 12/1999 | Mangles | 434/209 |
| 7,014,468 B1 | * | 3/2006 | Thorpe | 434/188 |
| 2002/0098774 A1 | * | 7/2002 | Huang | 446/487 |

* cited by examiner

*Primary Examiner*—Kurt Fernstrom
(74) *Attorney, Agent, or Firm*—Colin P. Abrahams

(57) ABSTRACT

An arithmetical manipulative device comprises a plurality of tiles, each tile having an upper surface, a lower surface, a first end and a second end, and a connector member for connecting the first end of one tile to the second end of a neighboring tile. The connector member is configured such that the one tile and the neighboring tile are pivotable relative to each other between a position wherein the upper surface of the one tile lies substantially adjacent the upper surface of the neighboring tile and the lower surface of the one tile lies substantially adjacent the lower surface of the neighboring tile. Further, the connector member is releasably connected to at least the one tile or the neighboring tile to permit a selected number of tiles to be serially assembled with respect to each other. The invention is also for a method for making arithmetical calculations.

9 Claims, 6 Drawing Sheets

120 — even number of math-flaps
124
122 — at least 1 orange math-flap

MANIPULATIVE TILE AS LEARNING TOOL

CROSS REFERENCE TO RELATED APPLICATIONS

This application claims the benefit of U.S. Provisional Patent Application No. 60/613,107 filed Sep. 27, 2004, the contents of which are incorporated herein by reference in their entirety.

FIELD AND BACKGROUND OF THE INVENTION

This invention relates to a manipulative tile or other form of device which may be used as both a teaching and a learning tool. In one preferred form, the invention relates to an arithmetical manipulative device, which comprises a tool used to teach mathematical operation of addition, subtraction, multiplication and/or division. The arithmetical manipulative device or tile of the invention is designed so as to provide users thereof with a visual and hands-on method for understanding arithmetical processes.

The arithmetical manipulative device of the invention preferably comprises a series of blocks, tiles or other shaped objects which may be strung together, and which are movable relative to each other into a multitude of different configurations. Using the arithmetical manipulative device by moving the tiles relative to each other, either individually or in groups, provides the visual and cognitive input to facilitate the understanding of arithmetical processes.

Teaching of arithmetic and arithmetical processes is essentially carried out conceptually in most cases. While some students are able to grasp and integrate these arithmetical manipulations on a conceptual level, other students clearly benefit by having reference to a physical, visual and preferably manipulative device which provides a concrete manifestation of the concept. While various physical objects may have been devised over the years to help understand arithmetical concepts, the present invention has expanded on the development of a physical and visual device to help many students learn arithmetical concepts and calculations.

SUMMARY OF THE INVENTION

According to one aspect of the invention, there is provided an arithmetical manipulative device comprising a plurality of tiles, each tile having an upper surface, a lower surface, a first end and a second end; and a connector member for connecting the first end of one tile to the second end of a neighboring tile, the connector member being configured such that the one tile and the neighboring tile are pivotable relative to each other between a position wherein the upper surface of the one tile lies substantially adjacent the upper surface of the neighboring tile and the lower surface of the one tile lies substantially adjacent the lower surface of the neighboring tile, the connector member being releasably connected to at least the one tile or the neighboring tile to permit a selected number of tiles to be serially assembled with respect to each other.

Preferably, each tile is generally a flat square, further comprising a pair of side edges between the first and second ends. The first end may comprise a recessed portion and an opposing pair of pivot pins within the recessed portion for receiving and pivotally connecting to the connector member. The second end may comprise a recessed portion, and a pair of opposing channels extending into the tile from the recessed portion, the recessed portion receiving the connector member.

Preferably, the connector member has a first edge for connecting to one tile, a second edge for connecting to the neighboring tile, the first and second edges of the connector member having connector pieces for releasably engaging the one tile and the neighboring to establish a pivotal connection there between.

The tile may comprise a generally spherical-shaped structure, and the connector member extends between one spherical structure and a neighboring spherical structure.

The device may further comprise a grid having a plurality of recesses therein for receiving the tiles. The tiles may be donut-shaped, and arranged on a template base having a plurality of pegs thereon in a grid pattern.

According to another aspect of the invention, there is provided a method for making arithmetical calculations, the method comprising forming a sequence of tiles arranged serially end-to-end with each other, the tiles being connected to each in a manner which allows neighboring tiles to be pivotable relative to each other so that one tile is able to lie over its neighboring tile; and arranging the tiles in the sequence of tiles to make rows and stacks to make arithmetical calculations.

The tiles may be arranged so as to perform arithmetic calculations selected from addition, subtraction, division and multiplication. Further, a plurality of sequences of tiles may be provided, the plurality of sequences of tiles being arranged and/or compared with respect to each other so as to make arithmetic calculations. The plurality of sequence of tiles may be arranged to show concepts of sets, odd and even numbers, factors, or units.

Preferably, different tiles may have different color or surface marking to distinguish them from other tiles. The tiles may be pre-constructed sequences of tiles, each pre-constructed sequence having a selected number of tiles therein, such as: 2, 3, 5, 10 and 20.

In one aspect, the present invention is for an arithmetical manipulative device. In one preferred form, the arithmetical manipulative device comprises a plurality of tiles, blocks, squares or other objects which may have different shapes, colors, surface markings and sizes, all of which may be preferably strung together so that each tile can be moved, pivoted or otherwise reoriented with respect to its adjacent tile or tiles.

In this specification, the term "tile" or "tiles" will be used generally to describe a component of the arithmetical manipulative device of the invention. However, it should be understood that the terms are to be broadly interpreted, and will typically comprise an object whose shape, size, color and other physical attributes may vary significantly. Central to the arithmetical manipulative device of the invention, however, is that any one tile may be connected to one or more other tiles, so that the connected tiles can be reoriented with respect to each other, and some of these mechanisms by which the tiles are connected, and the various forms of re-orientation achieved, are described as examples below.

While the reference to "tile" in this specification should be broadly understood, a tile in a preferred embodiment of the invention will typically comprise a somewhat flat, square or rectangular piece having upper and lower surfaces, a pair of side edges, and lateral ends. Preferably, the lateral ends are configured so that tiles may be joined to each other, preferably in a releasable manner, the join allowing the movement of one tile relative to the other. In a preferred form, an adjacent tile is movable through up to 360°, so that a tile may be swiveled or pivoted around to lie over the upper surface of its adjacent tile, or pivoted in an opposite direction so as to lie adjacent the lower surface of that tile.

With a plurality, or a string, of tiles arranged end-to-end in such a manner, an arithmetical manipulative device comprising a string of tiles is established, and the string of tiles can be folded into many configurations to provide a visual representation of arithmetical operations and/or calculations.

In accordance with another aspect of the invention, there is also provided a method of arithmetic instruction wherein the plurality of pivotally connected tiles are provided, and units or groups of tiles are folded with respect to each other to provide a visual representation of an arithmetic operation. The operation would typically be an addition, subtraction, multiplication and/or division.

DETAILED DESCRIPTION OF THE INVENTION

Reference is now made to the accompanying drawings which show both the apparatus comprising the arithmetical manipulative tiles, as well as their application in mathematical and arithmetic calculations. For the most part, the attached drawings show tiles which are generally flat and square, but the invention is not limited to such a tile. Furthermore, the enclosed illustrations show certain calculations, but it will be appreciated that the number of calculations that can be performed is almost infinite. Additionally, it has been mentioned that the tiles are capable of pivotal movement or re-orientation with respect to each other, as will become very apparent from the attached examples and associated text, and any mechanism whereby adjacent tiles can be so secured together to provide the pivotal or rotational movement would fall within the scope of the invention. Preferred connections are shown in the attached drawings and in this description, but the invention should not in any way be construed as limited to these examples.

Figure 1:
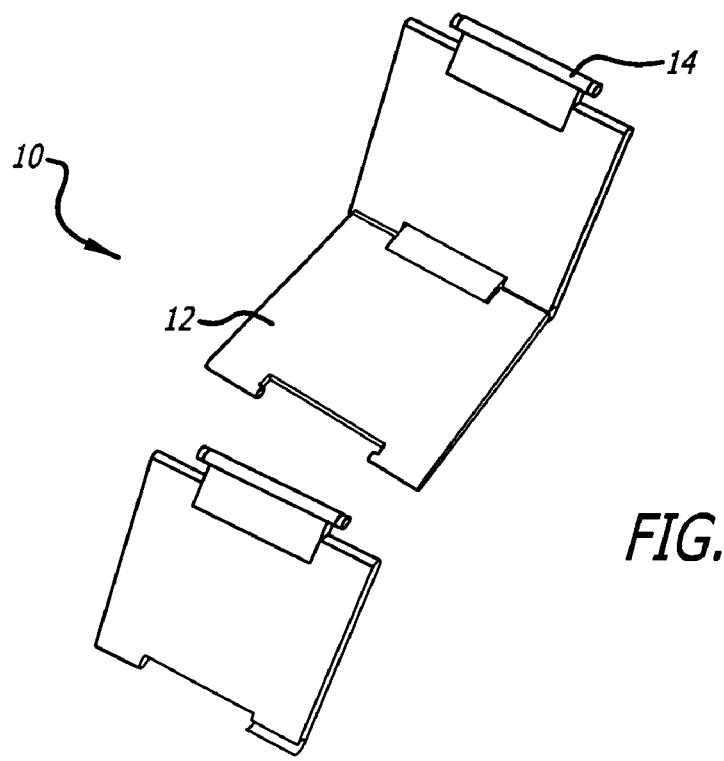
FIG. 1 is a perspective view showing three tiles of an arithmetic manipulative device in accordance with one aspect of the invention.

With reference to FIG. 1 of the drawings, there is shown a perspective view of an arithmetic manipulative device 10 in accordance with the invention. The arithmetical device 10 comprises essentially two portions, namely, a tile 12, and a connector 14. A plurality of tiles 12 are arranged serially with respect to each other, and are attached to each other, preferably in a releasable manner, by connectors 14 which are located between adjacent tiles 12.

Figure 2:
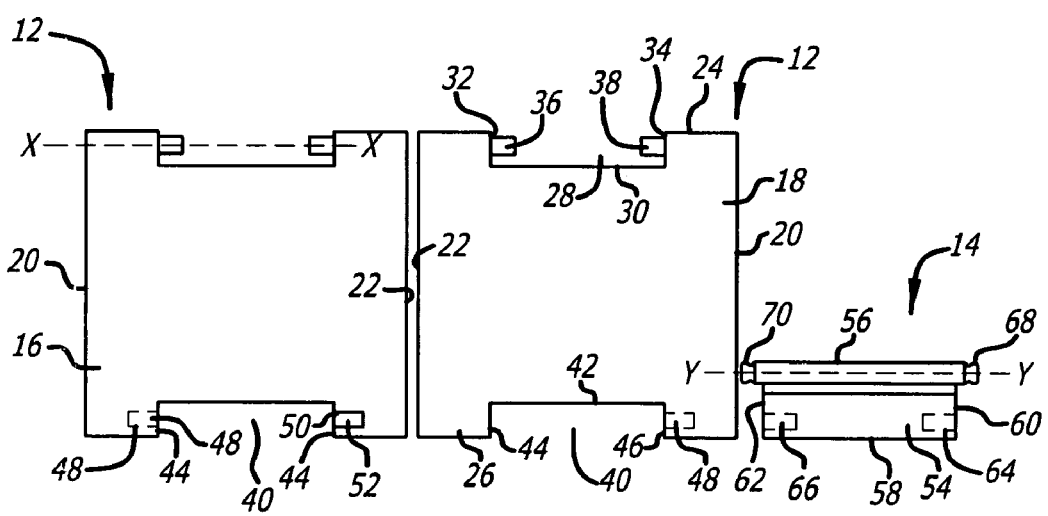
FIG. 2 shows another schematic representation of the tile, including a top view, bottom view and connector piece.

With reference to FIGS. 1 and 2 of the drawings, each tile 12 has an upper surface 16 and a lower surface 18. Further, each tile 12 comprises a first edge 20 and a second edge 22. The tile has a top end 24, and a bottom end 26. The top end 24 and bottom end 26 are configured so as to receive the connector 14 for establishing a pivotal connection between adjacent tiles 12 in a string of tiles comprising the arithmetical manipulative device 10.

The top end 24 has a rectangular recess 28, having a base 30 and side walls 32 and 34. Extending inwardly toward each other from each of the side walls 32 and 34 are cylindrically-shaped projections 36 and 38.

With respect to the bottom end 26, there is formed a rectangular recess 40, having a base 42 and side walls 44 and 46. A closed channel 48 extends from the side wall 46 into the tile 12. An open channel 50 extends from side wall 44 into the tile 12. The closed channel 48 is completely surrounded by tile 12, with an open outlet at the side wall 46. In contrast, the open channel 50 is only partially surrounded by tile 12, and has an open top 52 on the upper surface 16 of tile 12.

The connector 14 is shown as part of FIG. 2 of the drawings. The connector comprises a body portion 54 and a cylindrical axle portion 56. The body portion 54 has a base 58, and side walls 60 and 62. Extending inwardly from each of the side walls 60 and 62 are channels 64 and 66. The axle portion 56 is generally cylindrical in shape and, comprises a pair of opposing projections 68 and 70.

It will be clear from the drawings that a pair of adjacent tiles 12 are connected to each other pivotally by means of the connector 14. The body portion 54 is received within the rectangular recess 28 of a tile 12, and the projections 38 and 36 are respectively received in the channels 66 and 64 of the body portion 54. The projections 36 and 38, and the channels 64 and 66 are constructed so that the connector can be manipulated into position and secured, either in a manner which allows the user to separate them, or on a permanent basis. If the connector 14 and tile 12 are secured to each other on a permanent basis, a connector-tile unit is formed, as shown in the lower part of FIG. 1 of the drawings.

Figure 3:
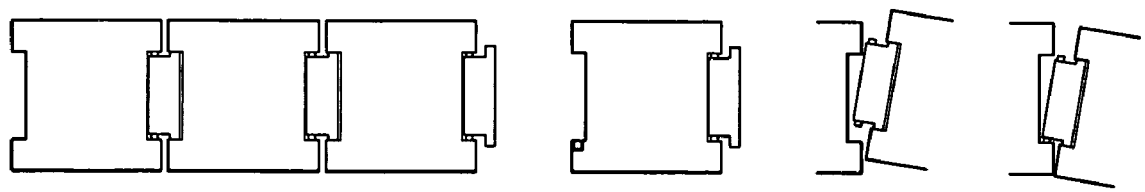
FIG. 3 shows a series of tiles, some joined, others not, including a schematic representation of the joining process.

The axle portion 56 is received within the rectangular recess 40 of the tile 12. The projection 70 is inserted into the closed channel 48, and the projection 68 is then inserted into the open channel 50, through the open top 52. Preferably, the projection 68 is received within the open channel 50 in a snap-on fashion so that the projection 68 will, in normal usage, remain within the open channel 50, but can also, under appropriate pressure, be removed. Reference is made to FIG. 3 of the drawings, where the connection procedure between adjacent tiles is shown on the right side of this Figure.

FIGS. 1 and 2 show a specific embodiment whereby the tiles 12 are connected to each other by means of the connector. The configuration of the tiles and the connector ensure that tiles 12 adjacent to each other are able to pivot and rotate about an axis X-X running through the projections 36 and 38, and axis YY running through the axle portion 56. In this way, adjacent tiles 12 can be oriented with respect to each other in a large number of positions. Most importantly, a tile 12 can be folded over to cover either the upper surface 16 or the lower surface 18 of an adjacent tile 12. Additionally, adjacent tiles 12 can be arranged linearly. The significance of this configuration will become more apparent when discussing examples of calculations set forth below.

The manipulative tiles of the invention can, as mentioned, be used in mathematical and arithmetical calculations, to provide visual and physical context for the student. Examples of these calculations are now described.

Division:

In a division calculation, a string of tiles can be connected together, the number of tiles representing any selected number. Thus, if the number 47 is required, a string of 47 tiles is counted off and assembled as a continuous string of tiles. From the configuration and structure of the tile 12 and connector 14 indicated above, it will be appreciated that the desired number of tiles can be formed into a string of tiles very easily. To facilitate the construction of a desired number of tiles, there is one aspect of the invention which provides for fixed tile strings of specific number. For example, a series of 10 tiles may be fixed together and always remain so connected. Similarly, a string of tiles numbering 5, 3, or 2 as examples only, may be provided. Thus, in this arrangement, it becomes easy and quick to secure together a string of tiles of desired number. Taking the example of the number 47, the user will put together four sets of 10-string tiles, plus, for example, 1 tile string of 5, and another tile string of 2. This obviates the sometimes tiresome need to count out and piece together 47 separate tiles.

In tile strings of specific number, the number of tiles on that string can be well marked thereon. Thus, a tile string comprising 10 tiles may have the number "10" on each tile of that string, or on one or more of such tiles, on the upper and/or lower surfaces thereof.

In order to create the desired number, individual tiles, or strings of tiles are connected, the connection between such tiles allowing free rotation or pivoting of adjacent tiles. Following the example above, 47 tiles would represent the number 47 to be used in various calculations.

Figure 4:
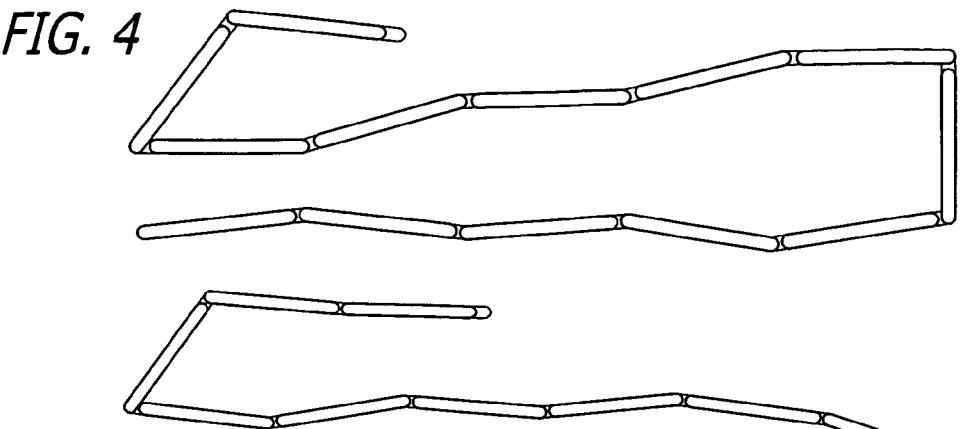
FIGS. 4, 5 and 6 show an arithmetic manipulative device comprising thirteen tiles in different configurations, performing an arithmetic calculation.

Using the manipulative tiles of the invention, an example equation "13÷4=?" can be solved in the following steps. First, 13 tiles are connected to each other to form a string, as illustrated in FIG. 4 of the drawings. The string of tiles may be placed in a line, preferably flat, such as on a table. Starting from one end of the string of 13 tiles, four tiles are counted off (because the divisor is 4), and the remaining tiles are folded about pivot point 80 in FIG. 5 of the drawings. The 4 tiles representing the divisor are indicated by reference numeral 82 in FIG. 5 of the drawings. The remaining flaps are folded about the pivot point 80, with tiles through 13 overlapping with the tiles indicated by reference numeral 82.

Figure 5:
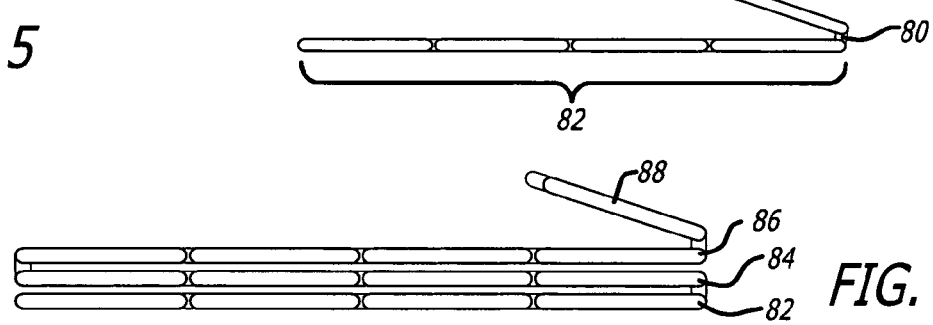
Figure 6:
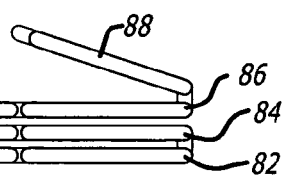
Figure 7:
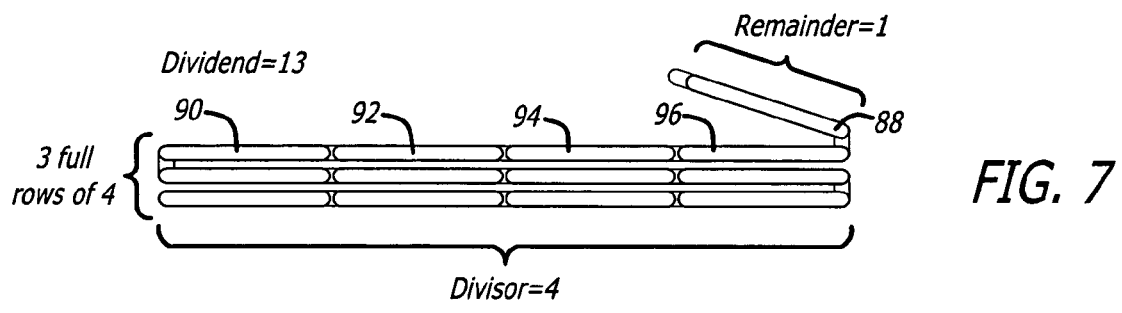
FIG. 7 shows the arithmetic manipulative device shown in FIGS. 4 to 6 of the drawings, annotated to indicate calculation.

The stacking of the tiles in 4-tile segments is repeated, as shown in FIG. 6 of the drawings. This results in three rows of 4-tile strings, indicated by reference numerals 82, 84 and 86. A single tile 88 remains. As will be appreciated, as the tiles are folded over, as indicated in the sequence of FIGS. 5 and 6 of the drawings, two outcomes are possible. Either all the stacks will be the same height, or they will not. In the equation "13÷4=?", three stacks have a final height of 3 tiles, with one tile 88 left over. The quotient, or answer to the problem, is the height of the even stacks, in this case, 3, plus the extra tile which represents the remainder, equal to 1. This is diagrammatically illustrated in FIG. 7 of the drawings. The reference numerals 90, 92, 94 and 96 represent the four stacks, each comprised of three tiles, and the reference numeral 88 is the remainder. Thus, the result of the operation "13÷4=?" is 3, representing three stacks, with a remainder of 1. Another way of stating the answer is 3¼, or 3.25.

Figure 8:
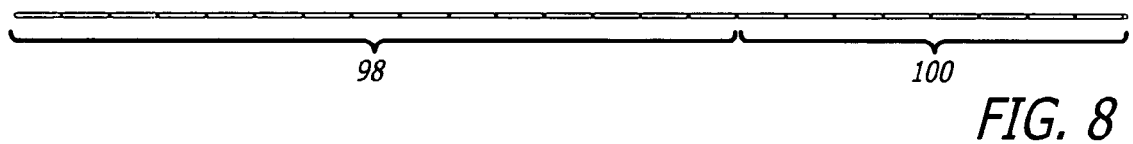
FIGS. 8 and 9 show the arithmetic manipulative device of the invention in a subtraction calculation.
Figure 9:
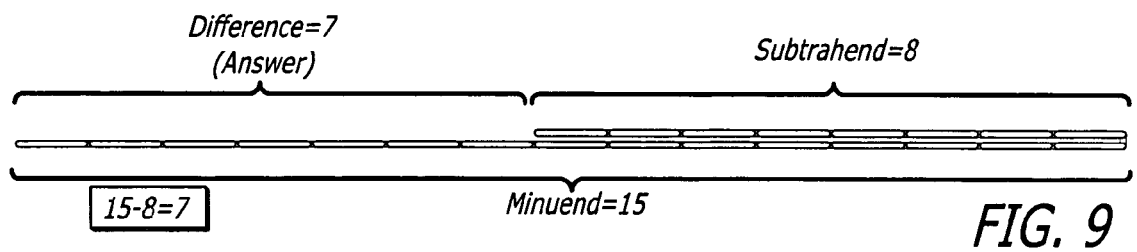

Subtraction:

Subtraction calculations can be easily carried out using the arithmetical manipulative tiles of the invention. Once such calculation is shown in FIGS. 8 and 9 of the invention, illustrating the problem "15−8=". In order to obtain the answer to this problem using the tiles of the invention, 15 tiles are joined together, preferably all in one color, as shown by reference numeral 98 in FIG. 8. Fifteen darker tiles are shown joined together. Thereafter, 8 tiles are joined together, preferably in a different color, as indicated reference numeral 100 in FIG. 8. The 15 tiles joined together and the 8 tiles joined together are each themselves attached to create a linear arrangement of the joined-together tiles. Once the two groups have been joined together, they are preferably laid flat on a table, with, for example, the group of 8 tiles being on the right, as shown in FIG. 8 of the drawings. The group of 8 tiles is folded over towards the left, over the group of 15 tiles. In mathematical jargon, the subtrahend of 8 is folded over the minuend of 15. The folded-over arrangement can be clearly seen in FIG. 9 of the drawings. In order to obtain the answer, the number of tiles are counted, starting from the left, until the second row, or second color, is reached. That number will, of course, be the answer, which is 7.

Figure 10:
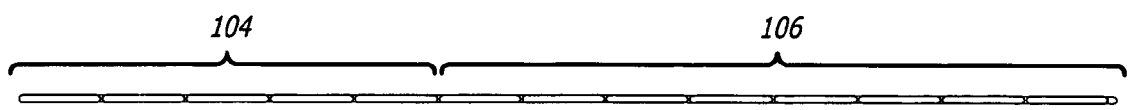
FIGS. 10 and 11 show the arithmetic manipulative device of the invention in a further subtraction calculation.
Figure 11:
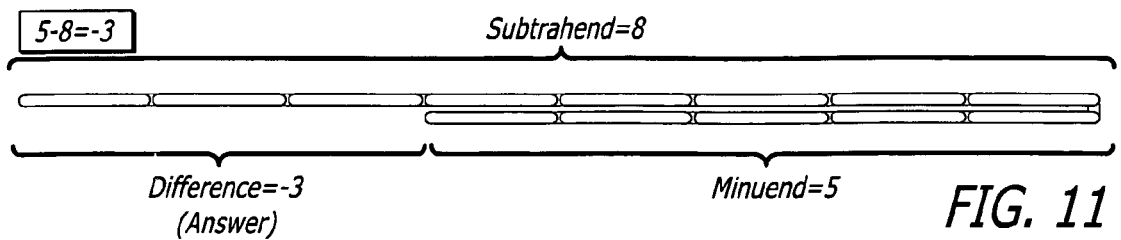

The same strategy will work even if the result is a negative number. Thus, if the subtrahend is greater than the minuend, the number of tiles extending past the minuend to left thereof is still counted. This can be seen in FIGS. 10 and 11 of the drawings, which show the equation "5−8=". FIG. 10 shows 5 tiles, having a reference numeral 104, linearly connected to 8 tiles, having the reference numeral 106. When the subtrahend is folded over the minuend, it overshoots the minuend by 3 tiles which are counted, indicating that the difference, or the answer, is minus 3.

Figure 12:
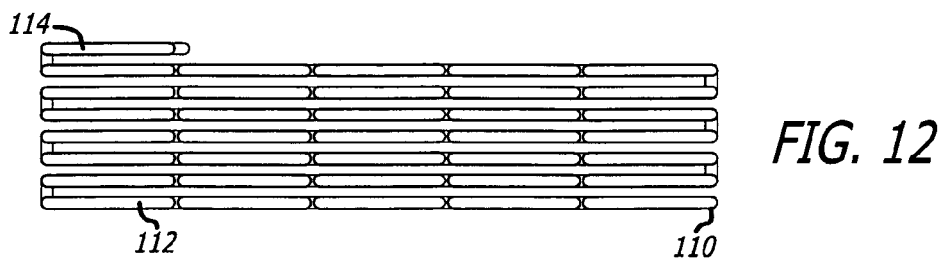
FIG. 12 shows an arithmetic manipulative device of the invention in an adding calculation.
Figure 13:
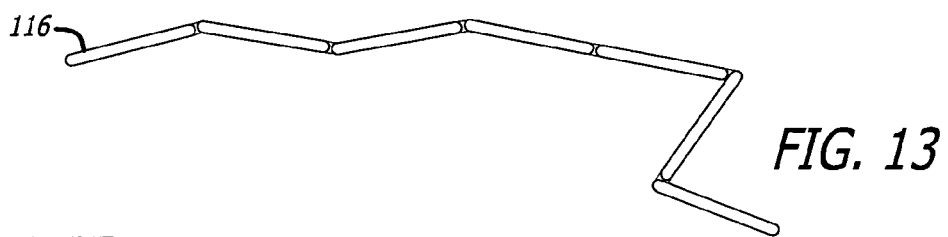
FIGS. 13, 14 and 15 show further details of the adding calculation initiated in the representation of FIG. 12 of the drawings.
Figure 14:
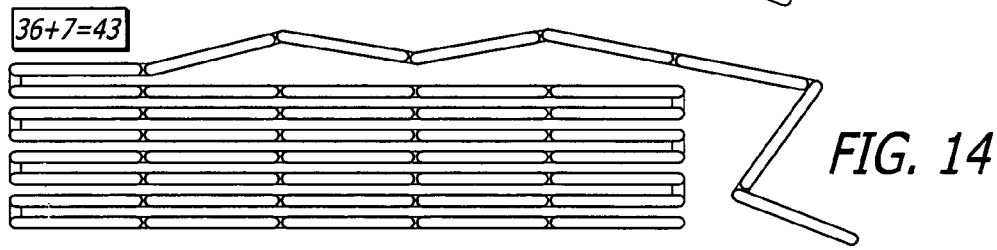

Addition:

Adding is a straightforward arithmetical operation to achieve and demonstrate through the manipulative tiles of the invention. An example of "36+7=" is an operation which is illustrated in FIGS. 12, 13 and 14 of the drawings. With reference to FIG. 12 of the drawings, there is shown a sequence of 36 tiles. Seven rows, a row shown by reference numeral 110, are shown, each row 110 comprising a linear series of 5 tiles, the tiles being referenced by numeral 112. The seven rows 110 of 5 tiles 112 each make up 35 tiles in all, with the additional tile 114 shown at the top left of FIG. 12. These tiles 112 may be of a particular color.

With respect to FIG. 13, a series of 7 tiles 116 is connected together. These tiles 116 are of different color to those tiles shown in FIG. 12 of the drawings, but this is not necessary for the operation of the calculation. The 7 tiles 116 shown in FIG. 13 are attached to the free end of tile 114, shown in FIG. 112, the resulting combination being illustrated in FIG. 14 of the drawings. The 7 tiles from FIG. 13, when connected to the tiles 112, from FIG. 12, are arranged over the tiles 112. When so connected, the total number of tiles is counted, either individually, or by adding the numbers in rows, stacks or any other combination, or using all of these arrangements, which may help the user to understand the concept of addition.

Figure 15:
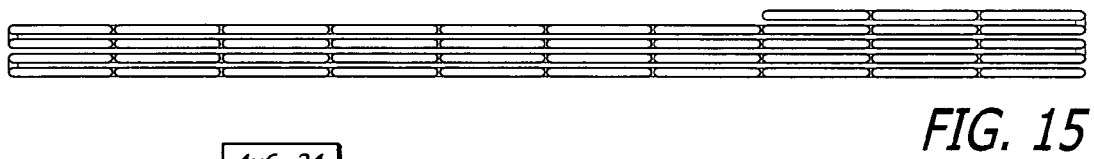

FIG. 15 shows an alternative way of visualizing addition or the sum of components, and understanding the cumulative property. In FIG. 15, groups of stacks in strings of 10 are constructed. Organizing the tiles in groups of 10 may make the answer easier to compute, by simply adding, when the 36 tiles are added to the 7 tiles, the addition of 10+10+10+10+ 3=43. Where different color tiles are used for the 36 and 7 tile sets respectively, users are able to see the color schemes, which may facilitate the understanding of the addition process.

Figure 16:
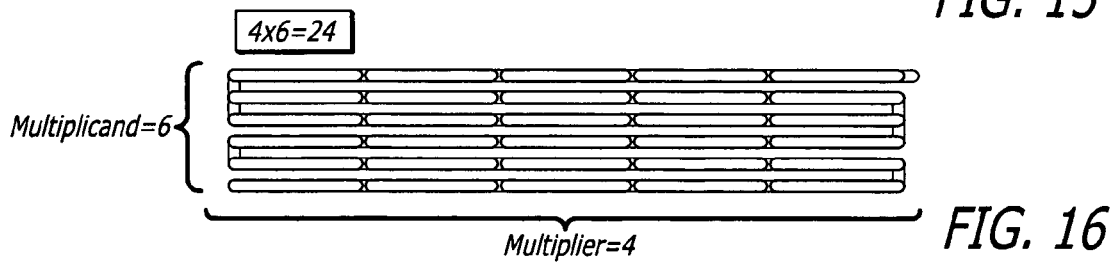
FIG. 16 shows an arithmetic manipulative device of the invention showing a multiplication calculation.

Multiplication:

Multiplying is somewhat similar to the process of addition, and, in this example, the problem "4×6=?" is used. In this case, the multiplier is 4, and 4 tiles are connected each other to form one string of 4 tiles. This process is repeated five more times so that there are 6 groups of 4 tiles each in all. The 4 tiles would represent the multiplier, while the 6 strings of tiles would represent the multiplicand. The six groups are connected together one at a time, laying the most recently connected group of strung-together tiles on top of the previous tiles, as shown in FIG. 16 of the drawings. When this process is complete, the total number of tiles is counted, which will be the product of the problem 4×6.

As was the case with the addition process, the manipulative tiles can be reorganized to show different equations which have the same product. This will include problems such as 2×12, 3×8 or 6×4. All result in the answer of 24, but the mechanism by which the tiles may be reorganized would assist the user in understanding the concept.

Figure 17:
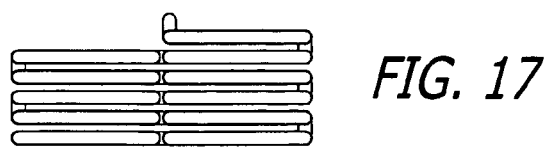
FIG. 17 shows an arithmetic manipulative device explaining the concept of odd and even numbers.

Odd and Even Numbers:

Using the tiles in accordance with the invention, it can be easily determined whether a number is odd or even. The appropriate number, such as 13, is chosen and 13 tiles are arranged linearly in accordance with the invention. Thereafter, two stacks are created, as would be the case when dividing a number by 2. FIG. 17 illustrates the odd and even number procedure. If the two stacks are the same height, the number is even. If not, as is the case with the number 13, illustrated in FIG. 17, the number is odd.

Figure 18:
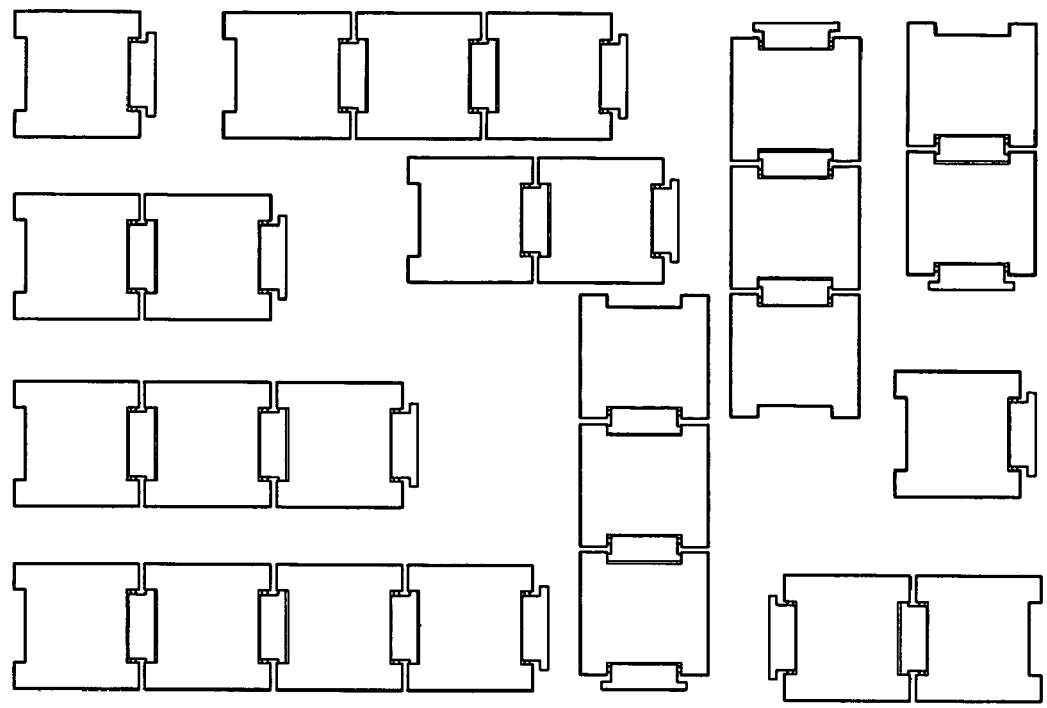
FIG. 18 shows various arithmetic manipulative devices of the invention providing a visual representation of sets.

Sets:

The concept of sets can also be visually and physically exemplified, using the arithmetic manipulative tiles of the invention. This is shown with reference to FIGS. 18 and 19 of the drawings. In FIG. 18, a combination of tiles can be put together using a variety of different colors, and with a variety of different numbers. Thus, FIG. 18 shows generally randomly arranged strings of tiles, 11 of which are illustrated in this Figure. Two colors are shown, namely, a darker tile and a lighter tile, and these may be mixed into strings or tiles or differing length, or the string may be of a single tile or a single color only.

Figure 19:
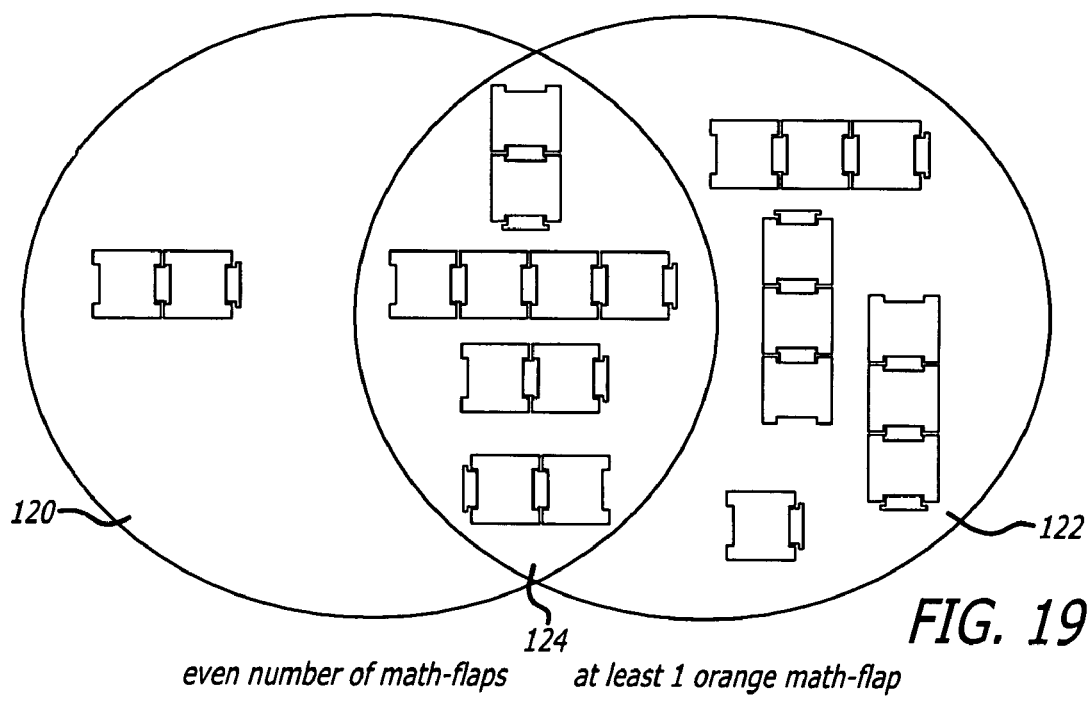
FIG. 19 shows an arrangement of the arithmetic manipulative device of the invention as shown in FIG. 18, the parts of which are arranged with respect to each other, to indicate different set concepts.

Using the string of tiles shown in FIG. 18 of the drawings, different types of sets can be created. An example is shown in FIG. 19 which illustrates two circles, namely, a left circle 120 and a right circle 122. The left circle 120 may contain, for example, strings of tiles which have an even number of tiles. The circle 122 may contain, for example, tiles or strings of tiles which have at least one light tile. An overlap portion 124 is created between circle 120 and 122, where both of these properties are present, namely, tile strings having an even number of tiles, as well as such tile strings which have at least one light colored tile. The properties for selection in the sets are, of course, arbitrarily selected in this description as an example only, and an infinite number of different sets, characteristics, requirements and properties may be created for the purposes of illustrating set concept.

Figures 20, 21:
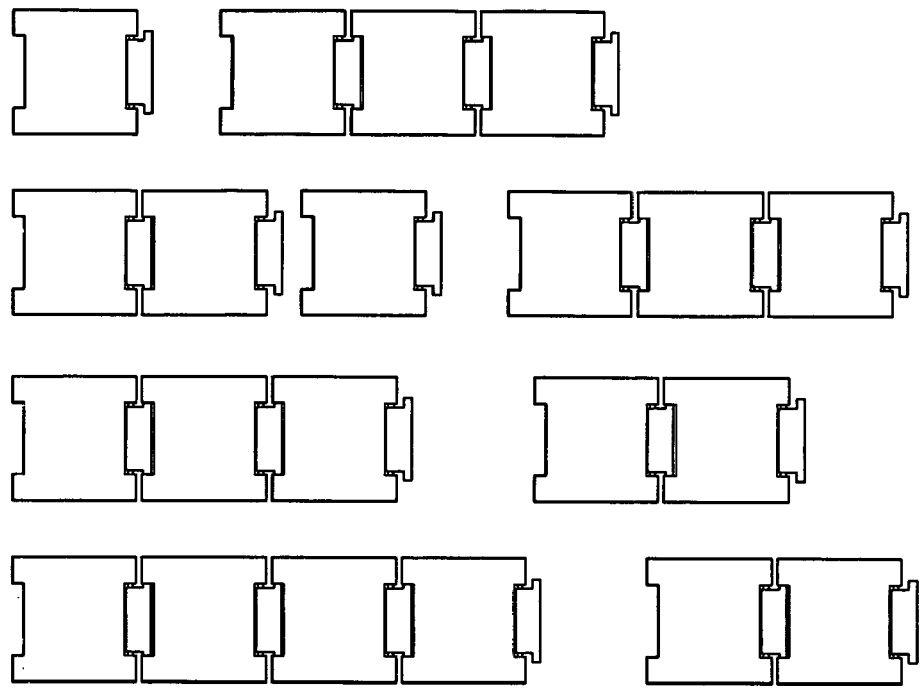
FIG. 20 shows yet a further arrangement of the arithmetic manipulative devices of the invention using color to explain arithmetic principles.
FIG. 21 shows arithmetic manipulative devices formed in boxes, explaining the concept of add ending.

Units:

The concepts of units can also be visually taught and illustrated using the manipulative tiles of the invention. In this case, two different colors, or two differently marked sets of tiles are used. With reference to FIG. 20 of the drawings, a teacher may create several groups of tiles of various sizes or lengths. Each group will be all of one color or marking. FIG. 20 illustrates such a concept, where tiles and strings of tiles are of one select color only and do not have a mixing thereof.

In FIG. 21 of the drawings, a student or user may be instructed to add together only tiles or strings of tiles of a certain color, such as the light color illustrated in FIG. 21. The user may be handed, one at a time, a tile or string of tiles, with instructions that only certain tiles (in FIG. 21, the lighter tiles) be added to a cumulative total. FIG. 21 shows the addend in the left-hand column, and the current sum in right-hand column. In the first row, there are 2 tiles and the current sum comprises 2 tiles. In the second row, a single tile of the same color is placed, and may therefore be added, creating a current sum of 3. In the third row, a different color tile string is provided, which is, according to the instructions to the student, not added, and the current sum in the right-hand column therefore remains unchanged. Finally, in the fourth row, 2 tiles comprising the color to be added are provided, and the current sum will increase by 2, to make a total of 5.

Figure 22:
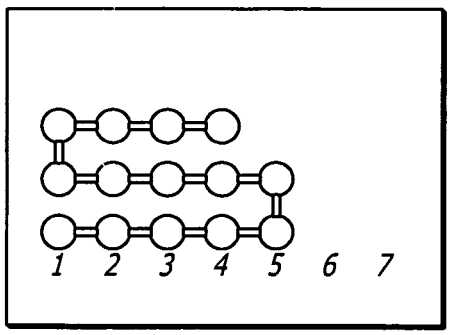
FIGS. 22 to 25 show different embodiments of the invention whereby a series of tiles or objects are folded and pivoted with respect to each other, or are arranged with respect to each other to show arithmetic principles.
Figure 23:
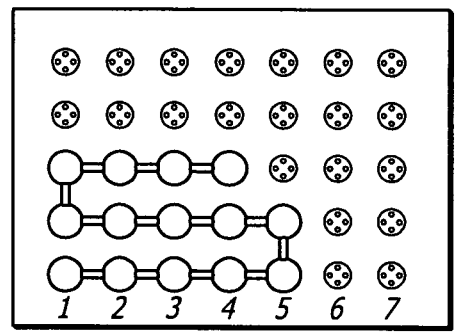

FIGS. 22 to 25 of the drawings illustrate different variations of the invention. In FIG. 22, a multitude of balls are pivotally connected to each other by interjacent connectors, but are otherwise pivotable and can be re-oriented in the manner defined with respect to the tiles above to perform the calculations in the examples provided. In FIG. 23, the balls and connectors shown in FIG. 22 are provided, but there is, in addition, a base or template comprising a grid of depressions in which the balls are placed. This may provide additional structure and agility to the string, to ensure that they are oriented with respect to each other in a clear grid pattern, based on the template.

Figure 24:
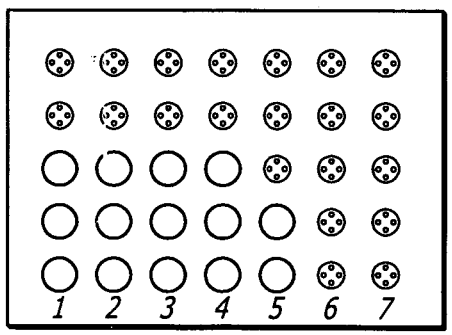

In FIG. 24, a similar concept to that described above is shown, wherein a series of balls is provided, but no connectors are used, since the balls are placed on a grid which causes the balls to be located in a manner which can be easily read and arithmetical problems calculated.

Figure 25:
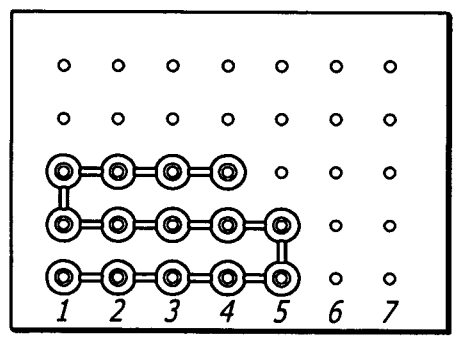

FIG. 25 shows yet another embodiment, including an optional template, and a plurality of donut-shaped objects which are pivotally held together by connectors.

It will be appreciated from the description, and particularly FIGS. 22 to 25, that the manipulative tiles of the invention may take a large number of different forms, so long as the objective thereof can be achieved, namely, the arrangement thereof in rows and stacks, so as to perform arithmetic calculations. In this regard, the tiles may be of any particular shape, color, form or pattern, and may have different forms of connection between the tiles. The connections may be releasable, or partially permanent on one side, so that a unit of a flap and connector is created.

The invention claimed is:

1. A method for making an arithmetical calculation, the method comprising:

forming a sequence of tiles consisting of a user selected and variable number of tiles based upon the arithmetical calculation to be made, the tiles being releasably arranged serially end-to-end with each other, the tiles being connected to each in a manner which allows adjacent tiles to be pivotable relative to each other so that one tile is able to lie over its adjacent tile; and arranging the tiles in the sequence of tiles into a relevant number of rows and stacks to effect the arithmetical calculation.

2. A method as claimed in claim 1 wherein the tiles are arranged so as to perform arithmetic calculations selected from addition, subtraction, division and multiplication.

3. A method as claimed in claim 1 wherein a plurality of sequences of tiles are provided, the plurality of sequences of tiles being arranged and/or compared with respect to each other so as to make arithmetic calculations.

4. A method as claimed in claim 3 wherein the plurality of sequence of tiles are arranged to show concepts of sets, or units.

5. A method as claimed in claim 1 wherein different tiles may have different color or surface marking to distinguish them from other tiles.

6. A method as claimed in claim 1 wherein pre-constructed sequences of tiles are provided, each pre-constructed sequence having a selected number of tiles therein.

7. A method as claimed in claim 6 wherein the pre-constructed sequence of tiles are comprised of sequences of tiles having one of the following numbers: 2, 3, 5, 10 and 20.

8. A method as claimed in claim 1 wherein the arithmetical calculation is addition and two sequences of tiles are attached to each other, and the number of tiles counted.

9. A method as claimed in claim 1 wherein a first number of adjacent tiles in the sequence of tiles have a first color and a second number of adjacent tiles in the sequence of tiles have a second color, the number of tiles in the first and second number of adjacent tiles respectively being selected based on the arithmetical calculation to be made.

* * * * *